United States Patent [19]

Korotenko et al.

[11] 3,846,653
[45] Nov. 5, 1974

[54] UNIPOLAR ELECTRIC TRANSMISSION

[76] Inventors: **Boris Evdokimovich Korotenko;
Vitaly Borisovich Korotenko,** both
of pereulok Armyansky 1/3, kv. 15;
Pavel Korneevich Shtepa, ulitsa
Pushkinskaya 52, kv. 177, all of
Kharkov, U.S.S.R.

[22] Filed: Mar. 26, 1973

[21] Appl. No.: 345,200

[52] U.S. Cl. ............................... 310/102, 310/178
[51] Int. Cl. ........................................ H02k 49/12
[58] Field of Search ............ 310/219, 178, 101, 102

[56] References Cited
UNITED STATES PATENTS

| | | | |
|---|---|---|---|
| 1,635,319 | 7/1927 | Gill et al. | 310/102 X |
| 1,987,479 | 1/1935 | Japolsky | 310/102 |
| 2,408,080 | 9/1946 | Lloyd | 310/102 |
| 2,845,554 | 7/1958 | Schwab et al. | 310/178 |
| 2,979,630 | 4/1961 | Bishop et al. | 310/178 X |
| 3,084,269 | 4/1963 | Sayers | 310/102 |
| 3,383,532 | 5/1968 | Zeisler | 310/102 |

*Primary Examiner*—D. F. Duggan
*Attorney, Agent, or Firm*—Waters, Roditi, Schwartz & Nissen

[57] ABSTRACT

A unipolar electric transmission adapted to provide smooth transitional speed control, comprising two coaxial acyclic machines with liquid-metal slip rings, which are combined into an adjustable-voltage system. The power circuit of each acyclic machine includes at least two operating current conductors, and with one of the operating current conductors of one of the acyclic machines being fixed to one of the operating current conductors of the second acyclic machine, both being connected to a drive which imparts rotation to the operating current conductors independently of the rotation of shafts. The shafts, in turn, are connected to other operating current conductors of respective acyclic machines.

Used as the operating current conductors are the armature and reactor of the first and second acyclic machines.

Used as the interconnected operating current conductors may be either the armatures or reactors of the acyclic machines.

Besides, the unipolar electric transmission is provided with a device for supplying liquid metal to the liquid-metal slip rings.

The device has two stages of intake components arranged as pipes whose intake edges are placed at a greater radial distance from the axis of the transmission than their outlet edges.

Thus, liquid metal fed from a cavity enclosed by a casing of the transmission passes through the two stages of the intake components and is then distributed among the slip rings of the unipolar transmission.

3 Claims, 5 Drawing Figures

UNIPOLAR ELECTRIC TRANSMISSION

The present invention relates to an electric drive employing an adjustable-voltage system for smooth speed control within a wide range, and more particularly to unipolar electric transmissions.

Unipolar electric transmissions may be used in machines requiring a compact device for changing smoothly and under load the gear ratio between shafts, for example, in automobiles, tractors, diesel locomotives, digging and road-building machines, metal-cutting machines, rolling mills and other transport or manufacturing machines.

Of a variety of devices for adjusting a gear ratio between shafts, the most convenient one, as regards control, is an electric transmission which makes for an automatic adjustment of the gear ratio between a drive motor and an operating member with respect to varying conditions of operation. For that reason, the electric transmission has been commonly used in machines with a transmitted power of hundreds and thousands of kilowatts.

Electric transmission consists of two DC electric machines, usually commutator ones, combined into an adjustable-voltage system. To change the gear ratio between the first machine rotates by a prime engine and the second machine which rotates an operating member, one acts upon the exciting current of the first and then of the second machine.

However, besides their large dimensions and weight, commutator machines have a commutation unit which is liable to wear, as it operates under arduous conditions due to the necessity of adjusting the machine's magnetic field with heavy currents through the armature circuit.

The use of more compact, reliable and cheaper AC machines in adjustable-voltage systems calls for the installation of complicated and expensive frequency converters which normally do not make for a sinusoidal voltage curve within a wide range of frequencies, as it abounds in high-order harmonic components, which exerts an unfavorable influence upon the operation of motors.

On the whole, the dimensions, weight and costliness of electric machines and systems incorporated both in AC and DC electric transmission limit the possibilities of their use in comparatively low-powered drives, in particular, in automobiles and tractors wherein, at present, use is made of multi-speed gear boxes which are highly inconvenient with respect to both manual and automatic control.

There have been attempts to use acyclic machines with liquid-metal contacts as electric transmissions.

Acyclic machines are essentially superior to all other electric machines with respect to such important characteristics as dimensions, weight, production effectiveness, production costs, overload capacity and driving power, which at low values of the output moment of inertia lowers the requirements imposed upon automatic control systems.

Acyclic machines have no commutator unit, while their power circuit does not require any devices like frequency converters.

The basic disadvantage of acyclic machines, which is their low voltage, is of no consequence for unipolar transmissions, as in this case two acyclic machines are combined coaxially into one unit, with their output buses toward each other, and have very short operating current conductors in their power circuits. Taking into account a small quantity of nonferrous metal in acyclic machines, its consumption per an entire unipolar transmission is many times lower than in electric transmissions based upon the employment of other types of electric machines.

A unipolar electric transmission is controlled in a manner absolutely analogous to the control of electric transmissions with DC commutator machines, i.e., it is done by way of acting upon the exciting currents of both acyclic machines of a transmission.

However, the manufacture of such compact units is hampered by unsatisfactory operation of liquid-metal contacts resulting from substantial electric and hydraulic losses therein which limit the effective torque and speed of acyclic machines.

Besides, while operating as a motor, an acyclic machine possesses a very low starting torque, as with fixed slip rings it is extremely difficult to effect distribution of liquid metal over the entire circumference in the gap between the rings.

All the foregoing applies to acyclic machines wherein one slip ring in each pair of such rings is fixed.

Of late there has been proposed a unipolar transmission which is free of said disadvantages (cf. US Pat. application No. 241,675 of Apr. 6, 1972). This is attained by forced rotation of all the operating current conductors of the machines, i.e., of their armatures and reactors and, consequently, of the slip rings attached to the latter, in one direction and at different angular speeds.

Such an embodiment drastically reduces electric and hydraulic losses in liquid metal contacts, as these losses are proportional to the third power of a relative rotation velocity of the slip rings; besides, it ensures the filling with liquid metal of the entire length of the circumference of an acyclic machine's slip ring at the moment of starting, when it operates as a motor.

Specifically, this is attained as follows: a transmission consists of two coaxial acyclic machines with liquid-metal slip rings, combined into an adjustable-voltage system, each having in its power circuit two operating current conductors which are the armature and reactor. One of the operating current conductors of the first machine is coupled to an operating current conductor of the second machine, both being set in forced rotation at the same speed. The other operating current conductor of the first machine which operates as a generator, is set in forced rotation in the same direction, but at a different speed. The remaining operating current conductor of the second machine operating as a motor, is coupled to the output shaft and may rotate at any preset speed, but necessarily in the same direction as the other operating current conductors.

A disadvantage of all unipolar machines and transmissions, including the above-mentioned one, resides in a complicated manner of the supply and circulation of liquid metal and, consequently, of the cooling of contacts which are marked by substantial hydraulic and electric losses. This is a major obstacle to producing reliable and compact unipolar transmissions.

In most cases, liquid metal is introduced directly into contact cavities; however, this rules out the possibility of the circulation of the metal to cool the contacts and make up for unavoidable losses of the metal in the course of operation.

Well known in the art is a device for supplying liquid metal to contacts of a unipolar generator, which consists of separately installed liquid metal pumps for the supply and circulation of metal along a closed circuit, provided with special heat exchangers, the number of the pumps and heat exchangers being equal to that of the contacts.

Disadvantages of said device lie in its complexity and bulkiness, as well as in its being less reliable due to the presence of a large number of exterior connections, which calls for duplicate pumps.

An object of the present invention is to provide a unipolar electric transmission with a simple and reliable filling of liquid-metal slip rings with liquid metal and the latter's circulation along a preset circuit under any conditions of the transmission's operation.

This object is attained by that in a unipolar electric transmission comprising at least two coaxial acyclic machines with liquid-metal slip rings combined into an adjustable-voltage system; a power circuit of each of said acyclic machines comprising two operating current conductors which are the armature and reactor; said armature of one of said acyclic machines being connected to that of the other acyclic machine for joint forced rotation by a drive; shafts of said acyclic machines, each being coupled to the reactors of respective acyclic machines for their rotation; a casing imparting rotation from the drive to the interconnected armatures of the acyclic machines, there is provided, in accordance with the invention, a device for supplying liquid metal to the liquid-metal slip rings, incorporating two stages of intake components whose intake edges are placed at greater radial distance from the transmission's axis than their outlet edges; said intake components of the first stage are connected to a rotary magnetic drive of the unipolar transmission's generator, while the intake components of the second stage are fixed to the armatures of the unipolar transmission; the intake edges of the intake components of the first stage are placed in a cavity containing liquid metal, which is enclosed by the casing of the transmission, while the outlet edges of the intake components of the first stage communicate with an annular groove engaging the intake edges of the intake components of the second stage.

An alternative embodiment of the invention provides a unipolar electric transmission with the armature of one of the acyclic machines being coupled to the reactor of the other acyclic machine.

In this case, the intake components of the second stage of the device for supplying liquid metal to the transmission's slip rings are fixed to said reactor of the acyclic machine.

Besides, in this embodiment of the invention, the device for supplying liquid metal to the transmission's contacts comprises an additional pressure stage whose intake components is fixed to the armature of the transmission's generator and supplies liquid metal to a liquid-metal slip ring between the armatures of the acyclic machines.

The invention will now be explained in greater detail with reference to embodiments thereof and to the accompanying drawings, wherein.

Figure 1:
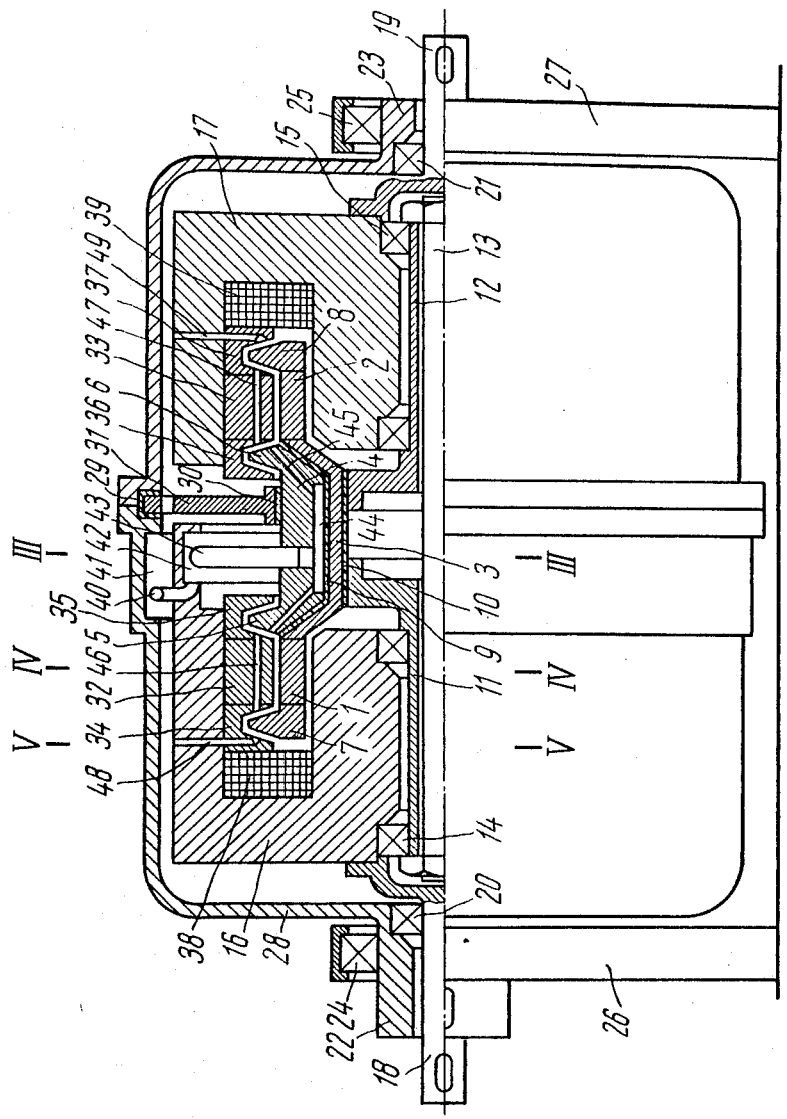
FIG. 1 represents a unipolar electric transmission with a device for supplying liquid metal to liquid-metal slip rings, in accordance with the invention.
Figure 3:
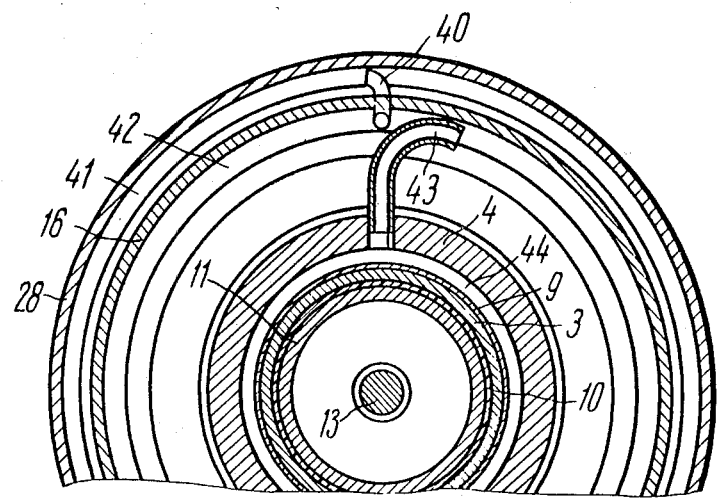
Figures 4, 5:
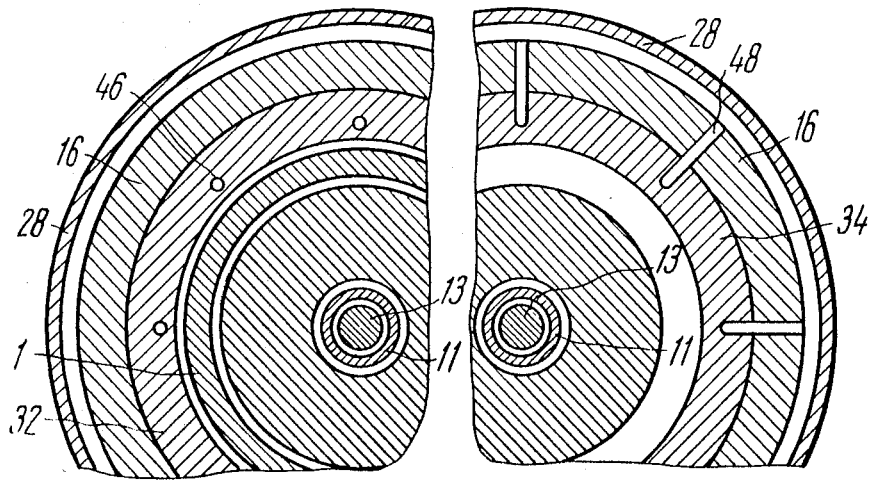

FIG. 3 is a section of FIG. 1 on III—III;
FIG. 4 is a section of FIG. 1 on IV—IV;
FIG. 5 is a section of FIG. 1 on V—V.

The proposed unipolar transmission consists of two coaxial acyclic machines with liquid-metal slip rings, which are combined into an adjustable-voltage system.

Each machine of the transmission has two operating current conductors which are its armature and reactor.

In the unipolar electric transmission shown in FIG. 1, armatures 1 and 2 of the two machines are bound together by an inner conductive cylinder 3 which is encased in an outer conductive cylinder 4 with inner slip rings 5 and 6. In turn, the armatures 1 and 2 have inner slip rings 7 and 8. Between the inner and outer cylinders 3 and 4, there is a seal course 9. By means of a seal course 10, the inner conductive cylinder 3 is rigidly coupled to semiaxles 11 and 12, which contains tie rod 13 that bounds said parts into a single unit. The semiaxles 11 and 12 are placed in bearings 14 and 15 whose races are disposed in magnetic circuits 16 and 17. The magnetic circuit 16 of the generator is fixed to an input shaft 18, while the magnetic circuit 17 of the motor is fixed to an output shaft 19. The shafts 18 and 19 are placed in bearings 20 and 21, respectively, whose outer races are rigidly secured in bushes 22 and 23 which are arranged coaxially with the shafts 18 and 19 in bearings 24 and 25. The outer races of the bearings 24 and 25 are placed in fixed supports 26 and 27 which take up the weight of the transmission.

The bushes 22 and 23 are rigidly coupled to a casing 28 of the transmission. The casing 28 is coupled, by means of seal courses 29 and 30 and an intermediate member 31, to the outer conductive cylinder 4 and ensures the connection of the armatures 1 and 2 of both machines to the exterior drive via the bush 22.

Placed in the magnetic circuits 16 and 17 and coupled thereto are reactors 32 and 33 which are hollow, normally ferromagnetic, cylinders arranged coaxially with the armatures 1 and 2. The reactor 32 has outer slip rings 34 and 35 embracing the inner slip rings 7 and 5, respectively, while the reactor 33 has outer slip rings 36 and 37 embracing the inner slip rings 6 and 8, respectively.

The magnetic circuits 16 and 17 also contain field windings 38 and 39. The proposed unipolar transmission is provided with a device for supplying liquid metal to said slip rings and for its circulation.

This device incorporates intake components, the first one being arranged as a pipe 40 mounted on the magnetic circuit 16.

The intake edge of the pipe 40 is placed in a cavity 41 which is an annular groove on the inner surface of the casing 28. The outlet edge of the pipe 40 is placed in an annular groove 42 in the magnetic circle 16.

The second intake component is a pipe 43 fixed to the outer conductive cylinder 4. The intake edge of the pipe 43 is placed in the annular groove 42, while its outlet edge is placed in an annular cavity 44 arranged in the outer conductive cylinder 4.

The annular cavity 44 is connected, via channels 45, to liquid-metal slip rings formed by the inner slip rings 5 and 6 and the outer slip rings 35 and 36.

The outer slip rings 35 and 36 are connected to the outer slip rings 34 and 37, respectively, via channels 46 and 47 in the reactors 32 and 33.

The outer slip rings 34 and 37 are connected, via channels 48 and 49, to a cavity formed by the inner surface of the casing 28.

Figure 2:
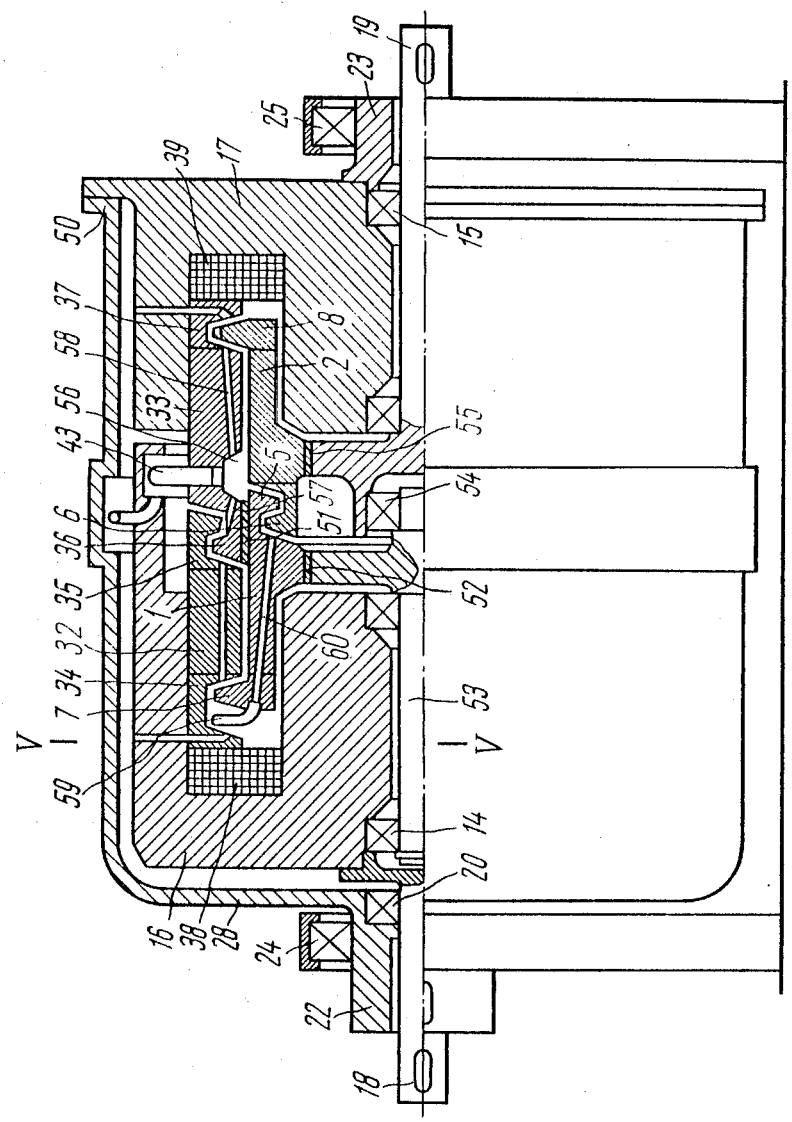
FIG. 2 represents an alternative embodiment of a unipolar electric transmission, according to the invention.

The unipolar electric transmission shown in FIG. 2 is arranged as follows. Both acyclic machines, as in the case of the transmission shown in FIG. 1, are placed in the casing 28, which also ends on the side of the input shaft 18 with the bush 22 placed in the bearing 24 coaxially with said shaft 18 which is rigidly coupled to the magnetic circuit 16 of the first acyclic machine and is centered by the bearing 20. On the other side, the casing 28 is coupled to the magnetic circuit 17 of the second acyclic machine means of a flange 50. The magnetic circuit 17 is, in turn, connected to the bush 23 placed coaxially with the output shaft 19 in the bearing 25. The magnetic circuits 16 and 17 contain the reactors 32 and 33 and the field windings 38 and 39 which are all coupled to them.

The reactors 32 and 33 have the slip rings 34, 35 and 36, 37, respectively, while the armatures 1 and 2 have the slip rings 7, 5 and 6, 8, respectively.

The reactor 33 of the second machine is mechanically linked for joint rotation to the armature 1 of the first machine by means of an intermediate member 51 whose function is performed by a toothed washer, both being coupled, by means of a seal course 53, to an intermediate shaft 53 centered by the bearings 14 and 54. The armature 2 of the second machine is fixed to the output shaft 19 by a seal course 55. The output shaft 19 is centered by the bearings 15. The outer races of the bearings 14 and 15 are secured in the magnetic circuits 16 and 17, respectively.

The device for supplying liquid metal in the embodiment disclosed in FIG. 2 differs from that shown in FIG. 1 in that the intake component of the second stage, i.e., the pipe 43, is connected to the reactor 33, while its outlet edge is in an annular cavity 56 arranged in said reactor 33. The annular cavity 56 is connected to the liquid-metal contacts formed by the slip rings 35, 36 and 18, 37 via channels 57 and 58 arranged in the reactor 33. Besides, there is another intake component of the second stage arranged as a pipe 59, fixed to the armature 1, hose intake edge is placed in the cavity of the outer slip ring 34 and whose outlet edge is connected, via a channel 60, to the liquid-metal contact formed by the rings 5 and 6.

FIG. 3 shows the intake components of the first stage arranged as the pipes 40 and the intake components of the second stage arranged as the pipes 43.

FIG. 4 and 5 show the arrangement of the channels 46 and 48 for the flow of liquid metal to the slip rings of the unipolar transmission.

The unipolar electric transmission shown in FIG. 1 operates as follows.

From the input shaft 18, rotation is transmitted to the magnetic circuit 16 rigidly coupled whereto is the reactor 32. Simultaneously, rotation from the bush 22 is transmitted to the casing 28 from which, via the seal courses 29 and 30 and the intermediate member 31, it is transmitted to the interconnected armatures 1 and 2. As this takes place, the rotation velocity of the magnetic circuit 16 is greater than that of the interconnected armatures 1 and 2.

The current through the field winding 38 of the generator induces a magnetic flux in the magnetic circuit 16. The difference in the rotation velocities of the reactor 32 which is coupled to the magnetic circuit 16 and the armature 1 accounts for the appearance of a potential difference across the butt ends of the latter. At this moment, electric current passes along the following circuit: armature 1 of the generator — slip ring 7 — slip ring 34 — reactor 32 of the generator — slip ring 35 — slip ring 5 — outer conductive cylinder 4 — slip ring 6 — slip ring 36 — reactor 33 of the motor — slip ring 37 — slip ring 8 — armature 2 of the motor — inner conductive cylinder 3 — armature 1 of the generator.

In the presence of current through the field winding 39 of the motor, the interaction between the magnetic field in the magnetic circuit 17 of the motor and the armature current brings about mutual rotation of the armature 2 and the reactor 33. Keeping in mind that the reactor 33 is rigidly coupled to the output shaft 19 via the magnetic circuit 17, the ratio of the currents in the field winding 38 of the generator and in the field winding 39 of the motor makes it possible to control the speed and torque of the output shaft.

The filling of the slip rings of the unipolar transmission with liquid-metal and the circulation of the latter are attained as follows.

Introduced into the casing 28 of the unipolar transmission is a preset quantity of liquid metal which further on, under the action of the centrifugal force resulting from the rotation of the casing 28, flows along the periphery of the inner surface of the casing 28 and fills the cavity 41 formed by the annular groove. Since the rotation velocity of the casing 28 is less than that of the magnetic circuit 16 and the bent pipe 40 attached thereto, a hydrodynamic head is brought about at the intake edge of that pipe which presses the liquid metal into the annular groove 42 in the magnetic circuit 16.

The value of said hydrodynamic head is determined from the following formula:

$$P_1 = R^2_1 (\omega_1 - \omega_2) 2\gamma/2g$$

where $R_1$ is the radius located wherein is the center of the intake edge of the pipe 40;

$\omega_1$ is the angular rotation speed of the pipe 40;

$\omega_2$ is the angular rotation speed of the casing 28;

$\gamma$ is the specific weight of the liquid metal;

$g$ is free-fall acceleration.

At the same time, the liquid metal in the pipe is under the action of the centripetal force which produces the pressure:

$$P_2 = \omega_1 2/65 /2g (R^2_1 - R^2_2)$$

where $R_2$ is the radius located wherein is the outlet edge of the pipe 40.

Provided that these pressures are equal, one determines a minimum radius up to which the first stage of the device can press the liquid metal:

$$R^2_1 (\omega_1 - \omega_2) 2\gamma/2g = \omega_1 2\gamma/2g (R^2_1 - R^2_2)$$

or, to simplify it:

$$R^2_1 (\omega_1 - \omega_2)^2 = \omega^2_1 (R^2_1 - R^2_2)$$

Assuming that for an optimum operation of the transmission it is desirable that the ratio $\omega_1 = 2\omega_2$ be maintained, we can find said minimum radius:

$$R_2 = \sqrt{3/2}\, R_1$$

To press the liquid metal closer to the axis of the unipolar transmission, another pressure stage is envisaged.

From the annular groove 42, under the action of the hydrodynamic head, the liquid metal is supplied, via the bent pipe 43, to the annular cavity 44 arranged in the outer conductive cylinder 4. The hydraulic head is produced as a result of the fact that the intake component (the pipe 43) fixed to the outer conductive cylinder 4 and, consequently, to the armatures 1 and 2 of the unipolar transmission, rotates slower than the magnetic circuit 16 with the annular groove 42.

From the cavity 44, under the action of centrifugal forces, the liquid metal flows, via the channels 45, to the contacts formed by the slip rings 5, 35 and 6, 36. These contacts are, in turn, connected, via channels 46 and 47, to another pair of contacts formed by the slip rings 7, 34 and 8, 37, wherefrom an excess of the liquid metal is ejected, under the action of centrifugal forces, into the cavity formed by the inner surface of the casing 28 via the channels 48 and 49, the latter functioning as a controller of the level of the filling of the contacts with the liquid metal.

The unipolar electric transmission shown in FIG. 2 operates as follows.

Here, as in the transmission shown in FIG. 1, the drive imparts a greater rotation velocity to the shaft 18 and a lower rotation velocity, to the bush 22. However, the casing is coupled to the magnetic circuit 17 of the motor whose reactor 33 is, in turn, rigidly connected to the armature 1 of the generator. The operating principle of this unipolar transmission remains the same as in the case disclosed in FIG. 1, although a change in the arrangement somewhat alters the operating current circuit armature 1 of the generator — slip ring 7 — slip ring 34 — reactor 32 of the generator — slip ring 35 — slip ring 36 — reactor 33 of the motor — slip ring 37 — slip ring 8 — armature 2 of the motor — slip ring 6 — slip ring 5 — armature 1 of the generator.

Besides, in the given transmission, fixed to the output shaft 19 is the armature 2 of the motor. In the unipolar electric transmission shown in FIG. 2, the supply of liquid metal to the contacts formed by the slip rings 7, 34; 35, 36; 8, 37 and its level control are effected as in the transmission disclosed in FIG. 1. As regards the contact formed by the slip rings 5, 6, to avoid a short circuit, the liquid metal is supplied there by means of a separate stage of the pump.

This stage consists of a bent pipe 59 fixed to the armature 1 of the generator and connected to the slip ring 5 via a channel 60. The hydrodynamic head that presses the liquid metal into said contact is caused by the fact that the pipe 59 rotates slower than the outer ring 34 fixed to the magnetic circuit 16.

Thus, both in the first and second foregoing unipolar electric transmissions, the rotation of the input shaft automatically results in the filling of all the slip rings with liquid metal. This ensures the transmission's reliable operation under any conditions, including the starting torque.

Besides, the foregoing device for the supply of liquid metal to the liquid-metal slip rings makes for the circulation of the liquid metal which functions as a coolant and dissipates heat at the places of its most intense liberation.

What is claimed is:

1. A unipolar electric transmission comprising at least two coaxial arcylic machines with liquid-metal slip rings, which are combined into an adjustable-voltage system; a power circuit of each said acyclic machine including two operating current conductors, each formed of respectively a rotatable armature and a reactor; the armature of one of said acyclic machines connected to the armature of the other acyclic machine for joint rotation thereof; shafts for said acyclic machines, each said shaft being coupled to the reactor of a respective acyclic machine for their rotation; a casing for transmitting rotation to the interconnected armatures of the acyclic machines; a device for supplying liquid metal to the liquid-metal slip rings, comprising first and second inlet conduits having the respective inlet ends thereof placed at a greater radial distance from the axis of the transmission than their respective outlet ends; said first inlet conduit being coupled to a rotary magnetic circuit of the generator of the unipolar transmission, and said second inlet conduit being coupled to the armatures of the unipolar transmission; the inlet end of the first inlet conduit being located within a cavity containing liquid metal which is enclosed by the casing of the transmission, and the outlet end of the first conduit communicating with an annular groove which engages the inlet end of the second conduit.

2. A unipolar electric transmission comprising at least two coaxial acyclic machines with liquid metal slip rings, which are combined into an adjustable-voltage system; a power circuit of each of said machines comprising two operating current conductors, each formed of respectively a rotatable armature and a reactor; said armature of one of said acyclic machines being coupled to the reactor of the other acyclic machine for joint forced rotation; shafts for said acyclic machines, each said shaft being coupled to the armature and reactor of a respective acyclic machine for imparting rotation thereto; a casing for transmitting rotation to the intercoupled armature of one acyclic machine and reactor of the other acyclic machine; a device for supplying liquid metal to the liquid-metal slip rings, comprising first and econd liquid intake components each having inlet ends placed at a greater radial distance from the center axis of the transmission than their outlet end; said first intake component being coupled to a rotary magnetic circuit of a generator for the unipolar transmission, and the second intake component being fixed to the reactor of a motor for the transmission, which rotates jointly with the armature of the generator; the inlet end of the first intake component extending into a cavity containing liquid metal, and which is enclosed by the casing, and the outlet end of the first intake component communicating with an annular groove engaging the inlet end of the second component.

3. A unipolar electric transmission as claimed in claim 2, wherein the device for supplying liquid metal to the slip-rings comprises an additional pressure stage having an intake component coupled to the armature of the generator and supplying liquid metal to a liquid-metal slip ring between the armatures of the acyclic machines.

* * * * *